United States Patent
Uttaro

(10) Patent No.: US 9,240,921 B2
(45) Date of Patent: *Jan. 19, 2016

(54) METHOD AND APPARATUS FOR PROVIDING A WIDE AREA NETWORK INFRASTRUCTURE

(71) Applicant: AT&T Intellectual Property II, L.P., Atlanta, GA (US)

(72) Inventor: James Uttaro, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/034,232

(22) Filed: Sep. 23, 2013

(65) Prior Publication Data

US 2014/0023065 A1    Jan. 23, 2014

Related U.S. Application Data

(63) Continuation of application No. 11/319,956, filed on Dec. 28, 2005, now Pat. No. 8,542,612.

(51) Int. Cl.

| | |
|---|---|
| H04J 1/16 | (2006.01) |
| H04L 12/66 | (2006.01) |
| H04L 29/06 | (2006.01) |
| H04L 12/28 | (2006.01) |
| H04L 12/46 | (2006.01) |
| H04L 12/751 | (2013.01) |

(52) U.S. Cl.
CPC ...... *H04L 29/06183* (2013.01); *H04L 12/2856* (2013.01); *H04L 12/462* (2013.01); *H04L 45/02* (2013.01)

(58) Field of Classification Search
CPC ... H04L 45/04; H04L 45/302; H04L 45/3065; H04L 45/38; H04L 47/10; H04L 47/20; H04L 47/2416

See application file for complete search history.

(56) References Cited

U.S. PATENT DOCUMENTS

| | | | |
|---|---|---|---|
| 6,628,622 | B1 | 9/2003 | Bulick et al. |
| 7,468,956 | B1 | 12/2008 | Leelanivas et al. |
| 8,542,612 | B1 | 9/2013 | Uttaro |
| 2004/0008700 | A1 | 1/2004 | Visser et al. |
| 2006/0227758 | A1 | 10/2006 | Rana et al. |

*Primary Examiner* — Melanie Jagannathan

(57) ABSTRACT

A method and apparatus for providing a wide area network infrastructure for providing services on IP networks such as Voice over Internet Protocol (VoIP) and Service over Internet Protocol (SoIP) networks are disclosed. For example, an enterprise customer may subscribe to a service for obtaining a reliable wide area network infrastructure for communicating among two or more customer locations. The network service provider creates a virtual private network in the public domain and another virtual private network in the private domain to interconnect the customer locations. It then connects each customer edge router to two provider edge routers one in each domain and/or instances of provider edge functionality in each domain. Routes are then advertised via two control planes to both virtual private networks.

20 Claims, 4 Drawing Sheets

200

300 ns rely on their Internet connections for staying
METHOD AND APPARATUS FOR PROVIDING A WIDE AREA NETWORK INFRASTRUCTURE This application is a continuation of U.S. patent application Ser. No. 11/319,956, filed Dec. 28, 2005, now U.S. Pat. No. 8,542,612 and is herein incorporated by reference in its entirety.

The present invention relates generally to communication networks and, more particularly, to a method for providing a wide area network infrastructure for services provided on packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP are becoming ubiquitous and more and more businesses and consumers are relying on their Internet connections for staying connected and being able to conduct business at anytime from anywhere. For example, enterprises with employees and business partners spread out across multiple geographical areas are able to expand their business globally by utilizing the Internet for communications. However, the Internet is a public network and is not as reliable or secure as privately leased lines which are not shared. Therefore, they have predetermined performance level and security. However, as businesses expand globally, the number of interconnected sites increases. The cost of enabling all employees and business partners to communicate via leased lines can become prohibitive.

Therefore, there is a need for a method that enables a service provider to provide a reliable wide area network infrastructure for providing services on VoIP and/or SoIP networks.

SUMMARY OF THE INVENTION

In one embodiment, the present invention discloses a method and apparatus for providing a reliable wide area network infrastructure for supporting services that are provided on packet networks such as Voice over Internet Protocol (VoIP) and Service over Internet Protocol (SoIP) networks. For example, an enterprise customer may subscribe to a service for obtaining a reliable wide area network infrastructure for communicating among two or more customer locations. The network service provider creates a virtual private network in the public domain and another virtual private network in the private domain to interconnect the locations. In one embodiment, the service provider provides the customer with a menu for entering the data for connecting the various locations and gathers other information from the customer. It then connects each customer edge router to two provider edge routers one in each domain and/or instances of provider edge functionality in each domain. Routes are then advertised via two separate control planes, e.g., two border gateway protocol control planes, to both virtual private networks.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a wide area network infrastructure for providing services on packet networks such as Voice over Internet Protocol (VoIP) and Service over Internet Protocol (SoIP) networks. Although the present invention is discussed below in the context of VoIP and SoIP networks, the present invention is not so limited. Namely, the present invention can be applied to any other networks used to interconnect multiple customer locations.

Figure 1:
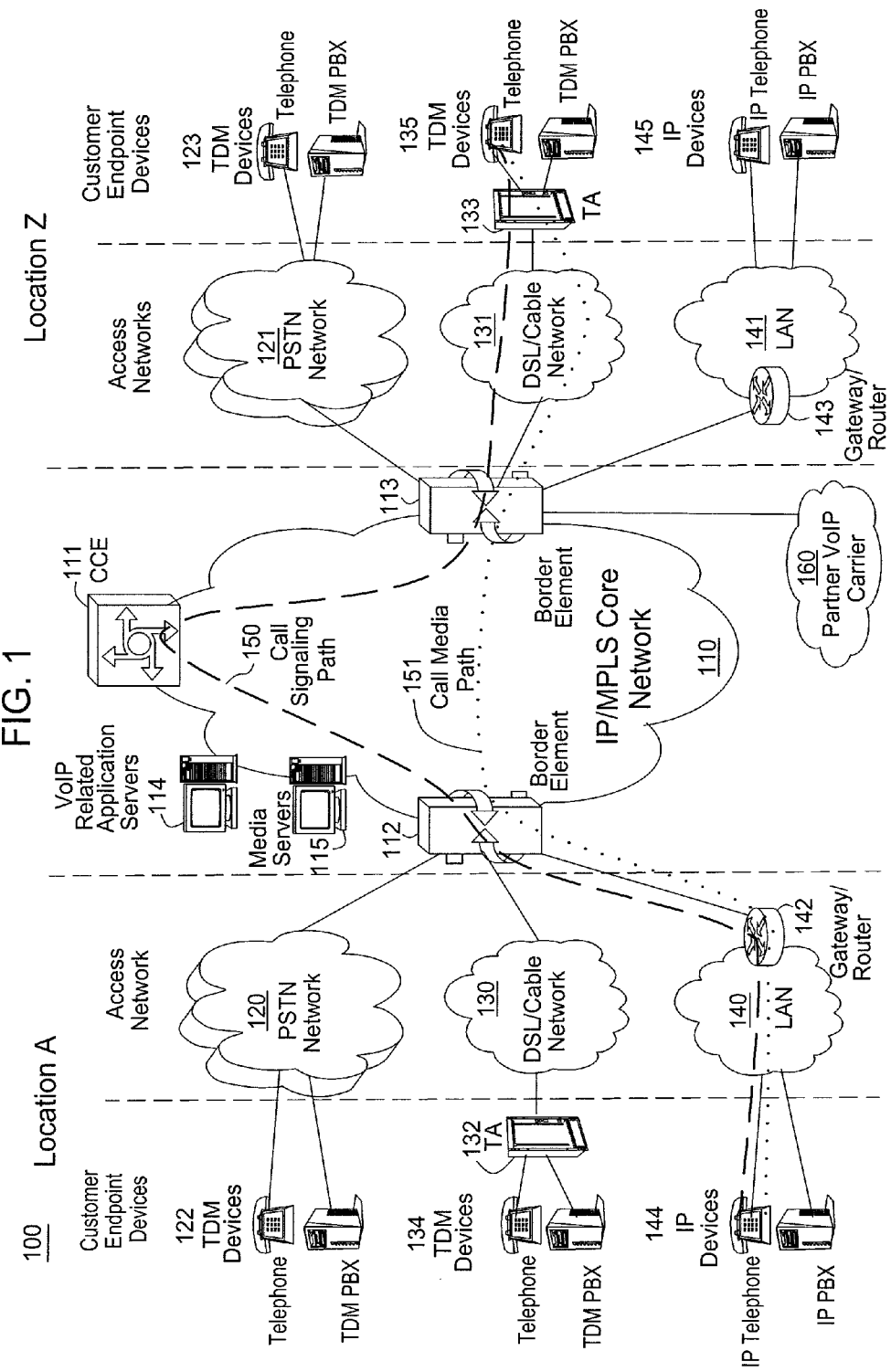
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on networks such as VoIP and SoIP networks. Internet services are becoming ubiquitous and more and more businesses and consumers are relying on their Internet connections for conducting businesses and staying connected. For example, enterprises with employees and business partners spread out across multiple geographical areas are able to expand their business globally by utilizing the Internet for communications. However, the Internet is a public network and is not predictable. For example, traffic throughput rates, packet loss statistics, etc. vary over time. Another alternative is to lease lines that would not be shared. Leased lines are predictable in terms of performance but they are costly. As businesses expand globally, the number of interconnected sites naturally increases. The cost of enabling all employees and business partners to communicate via leased lines may become prohibitive.

Network service providers offer virtual private network services to enterprises with a need to communicate across multiple geographical areas. Thus, enterprise customers may extend their network by establishing a wide area network using the virtual private network services provided by the network service provider. For example, an enterprise may utilize virtual private network services for communication among multiple Local Area Networks (LANs). However, the use of virtual private network for critical applications has also increased the enterprise customers' exposure to down time associated with the Wide Area Network (WAN). For example, businesses may loss significant percentage of their revenue during a failure in the WAN.

In one embodiment, the current invention discloses a method and apparatus for providing a reliable wide area network infrastructure to support services provided on networks such as VoIP and SoIP networks. In order to clearly illustrate the teachings of the current invention, the following terminologies and networking concepts will first be described:

Virtual Private Network (VPN);
Customer Edge (CE) device;
Provider Edge (PE) device; and
Border Gateway Protocol (BGP).

Virtual Private Network (VPN) is a private network that uses a public network to interconnect multiple sites and users. VPN uses virtual connections routed through the public network to connect remote sites, mobile users, corporate LANs, etc. For example, a VPN may have a LAN at a corporation's main office, remote LANs at branch offices and individual employees connecting mobile devices, etc. The public network may be the Internet or a network from a service provider.

Customer Edge device refers to a device located at a customer location (or an enterprise LAN) and is used to communicate with a provider edge device as defined below via a data link such as Ethernet, Frame Relay, etc. A customer edge device may be a router or a switch. A customer edge router is a routing peer to the provider edge device to which it is attached but not to other customer edge routers in other sites. For example, the customer edge device provides the addresses at its site to the provider edge device using Border Gateway Protocol (BGP) as described below. The routing information about a particular VPN is present only in the PE routers attached to the VPN.

Provider Edge (PE) device refers to a router administered by a network service provider and is used to communicate with customer edge devices. For example, a PE obtains routing information from the customer edge devices using the border gateway protocol. A PE device may be used to attach labels to the customer traffic to identify the VPN associated with the packet.

A PE may be used in a public domain or a private domain. If the PE is in the public domain, it is used to support customers connected through routers with addresses in global routing tables. The global routing tables are publicly available. A VPN may be established through routers with addresses in the public domain.

In one embodiment, a PE used in a private domain is reachable only from trusted sources, e.g., a trusted CE device. For example, internal network traffic within the service provider's network may utilize a PE in the private domain and the addresses may not be globally available. Namely, the router addresses are not publicly available. Thus, a VPN established in the private domain uses routers with addresses not available in global routing tables.

Border Gateway Protocol (BGP) refers to a protocol designed to pass routing information between systems run by different administrators. BGP has methods for passing attributes of routes between a CE and a PE.

A service provider with an IP backbone may provide VPN services to enterprise customers. For example, each enterprise location may have Customer Edge device(s) attached to one or more Provider Edge (PE) devices. The CEs at a customer location are on a LAN and the traffic from endpoint devices can reach multiple CEs on the LAN. BGP is used for obtaining routing information from the CEs and for distributing routes over the backbone network. For example, Multi Protocol Label Switching (MPLS) can be used for forwarding the packets over the backbone network. MPLS enables the service provider to pre-provision routes called Label Switched Paths (LSP) across the backbone network. LSPs are a sequence of labels inserted at the beginning of the packets at each device along the path from the source to the destination. The labels contain network protocol and information needed for forwarding the packet. If a CE supports MPLS and the enterprise customer is willing to provide the complete set of routes for the VPN to the PE, the PE can distribute a label for each route provided by the CE. However, when there is a failure in a VPN, the various customer locations are no longer able to communicate.

In one embodiment, the current invention discloses a method and apparatus for providing a reliable wide area network infrastructure by enabling routes to be advertised into two infrastructure VPNs. For example, two VPNs may be provided for the customer through the IP network, e.g., one in a public domain (e.g., using a public PE) and one in a private domain (e.g., using a private PE). Each of the customer edge devices at a location are then attached to both provider edge routers. The routes are then advertised via two BGP control planes into both VPNs.

Figure 2:
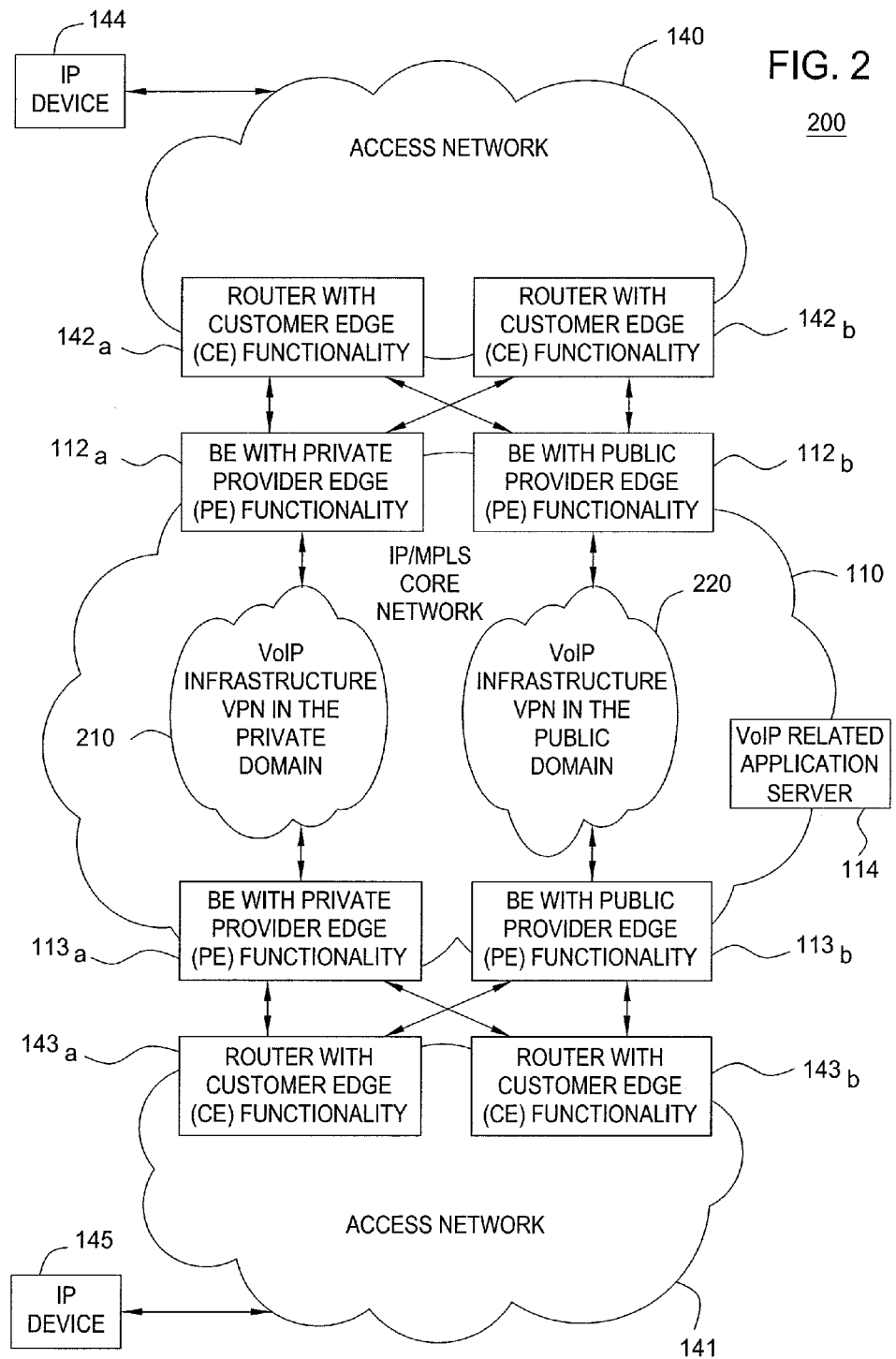
FIG. 2 illustrates an exemplary network with one embodiment of the invention for providing a reliable wide area network infrastructure for services.

FIG. 2 illustrates an exemplary network 200 with one embodiment of the present invention for providing a reliable wide area network infrastructure for IP services. For example, an enterprise customer is using an IP device 144 to access the IP services such as VoIP and SoIP services. IP device 144 is connected to an access network 140 (LAN). The access network 140 may contain gateway routers 142a and 142b. The gateway routers are connected to the IP/MPLS core network 110 through the border elements 112a and 112b. The enterprise customer also has a user at a remote location using an IP device 145 to access services. The IP devices 145 is connected to the access network 141 (e.g., a remote LAN). The access network 141 may contain gateway routers 143a and 143b. The gateway routers are connected to the IP/MPLS core network 110 through the border element 113a and 113b. The CE functionality is provided in the gateway routers 142a, 142b, 143a and 143b. The PE functionality is provided in the border elements 112a, 112b, 113a and 113b. A VoIP (or SoIP) application server 114 is also deployed in the IP/MPLS core network. In one embodiment, the service provider utilizes the application server 114 to implement the present invention for providing two VPNs to create a reliable WAN infrastructure.

In one embodiment, a VoIP infrastructure VPN 210 in a private domain and another VoIP infrastructure VPN 220 in a public domain are established through the VoIP network 110 to connect the access networks 140 and 141 and enable a WAN connectivity between the end devices 144 and 145. In one embodiment, multiple CEs and PEs are deployed to connect each site or LAN and routes between the two sites or locations are advertised in both VPNs. The packets can be sent using either VPN. In one embodiment, the customer may utilize load sharing based on capacity or implement primary/backup mechanism for selecting which CE and PE router pair should be used for a particular packet. Note that only the network elements used to describe the invention are illustrated in FIG. 2. It is not intended to show all network elements used to deliver a VoIP or SoIP service.

Figure 3:
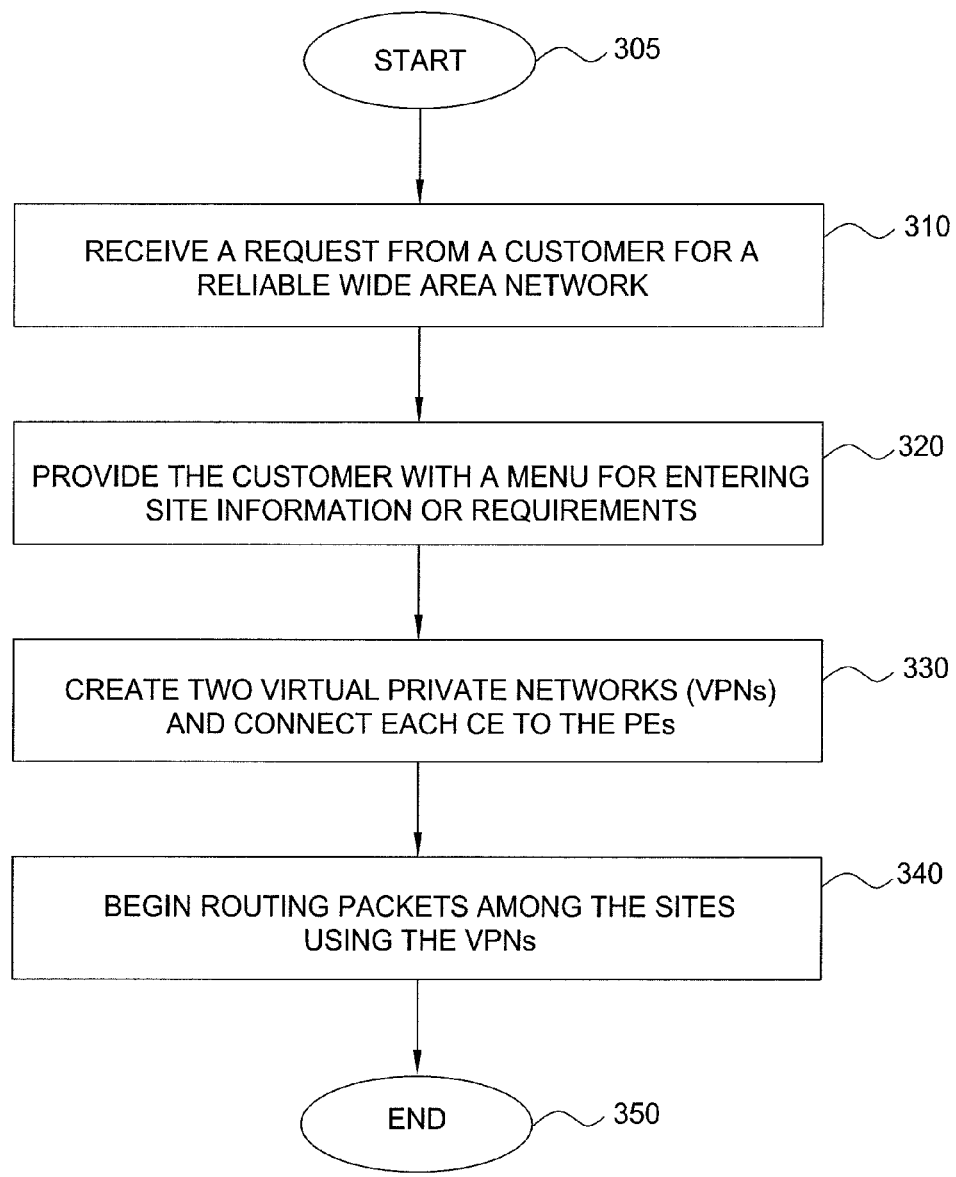
FIG. 3 illustrates a flowchart of the method for providing a reliable wide area network infrastructure for services.

FIG. 3 illustrates a flowchart of one embodiment of a method 300 for providing a reliable wide area network infrastructure for services. For example, the service provider enables an enterprise customer to subscribe to a VPN service for creating a reliable wide area network infrastructure.

Method 300 starts in step 305 and proceeds to step 310. In step 310, method 300 receives request from a customer to create a reliable WAN for communicating among two or more customer locations. For example, a customer may access an application server of the service provider and enters a request for creating a WAN infrastructure that connects a plurality of remote locations, e.g., main office locations, users with mobile devices, etc.

In step 320, method 300 provides the customer with a menu for entering information pertaining to the customer sites, e.g., the number of CE router(s) at each site, the set of address prefixes at each CE router's site, proposed locations for PE routers, etc. For example, a customer may choose to connect a CE at a site to two PEs placed at physically different locations for redundancy purposes.

In step 330, method 300 receives the information entered by the customer, and creates at least two VPNs (e.g., one VPN on a public VPN domain having a public PE router and one VPN on a private VPN domain having a private PE router) and connects each CE router to both the private and the public PE routers. Routes are then advertised via BGP sessions to both VPNs. In other words, the routes are advertised on two completely different control planes. Thus, if one control plane suffers a failure, the CE device may continue to communicate with the other PE.

In step 340, method 300 begins routing the packets among the customer sites using the both VPNs. Namely, routes between two or more customer sites or locations are advertised in both VPNs. The method then ends in step 350.

In one embodiment, the customer may implement a mechanism for load sharing among the CEs at a site using an internal gateway protocol. For example, load sharing may be established based on a set of address prefixes or business communities. In another embodiment, the customer may establish a primary and backup mechanism for distributing the traffic among the CEs at a site. For example, one CE may be used only during congestion.

Figure 4:
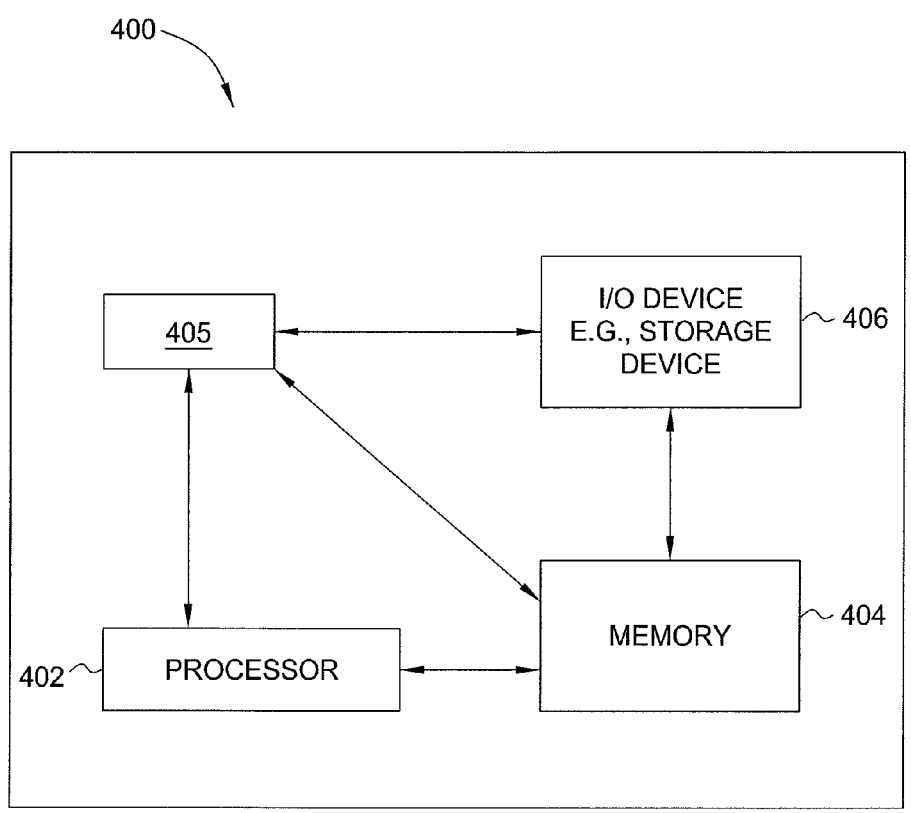
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a reliable wide area network infrastructure for services, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a reliable wide area network infrastructure for services can be loaded into memory 404 and executed by processor 402 to implement the functions as discussed above. As such, the present method 405 for providing a reliable wide area network infrastructure for services (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for advertising routes in a communication network, the method comprising:
   creating, via a processor, a first virtual private network in a public domain of the communication network;
   creating, via the processor, a second virtual private network in a private domain of the communication network, wherein the first and the second virtual private networks are controlled via two separate control planes; and
   advertising, via the processor, the routes between two sites over the two separate control planes to the first and second virtual private networks.

2. The method of claim 1, wherein the communication network is an internet protocol network.

3. The method of claim 1, wherein the routes are advertised via border gateway protocol sessions.

4. The method of claim 1, wherein the first virtual private network comprises a public provider edge device, and wherein the second virtual private network comprises a private provider edge device.

5. The method of claim 1, where the first and second virtual private networks are created in response to a request from a customer.

6. The method of claim 5, wherein a menu is provided to the customer for receiving data for connecting the two sites with the first and second virtual private networks.

7. The method of claim 6, wherein the data received from the customer comprises a number of customer edge routers at each of the two sites, a set of address prefixes at each of the two sites, and a plurality of proposed locations for a plurality of provider edge routers.

8. A non-transitory computer-readable medium storing a plurality of instructions which, when executed by a processor, cause the processor to perform operations for advertising routes in a communication network, the operations comprising:
   creating a first virtual private network in a public domain of the communication network;
   creating a second virtual private network in a private domain of the communication network, wherein the first and the second virtual private networks are controlled via two separate control planes; and
   advertising the routes between two sites over the two separate control planes to the first and second virtual private networks.

9. The non-transitory computer-readable medium of claim 8, wherein the communication network is an internet protocol network.

10. The non-transitory computer-readable medium of claim 8, wherein the routes are advertised via border gateway protocol sessions.

11. The non-transitory computer-readable medium of claim 8, wherein the first virtual private network comprises a public provider edge device, and wherein the second virtual private network comprises a private provider edge device.

12. The non-transitory computer-readable medium of claim 8, where the first and second virtual private networks are created in response to a request from a customer.

13. The non-transitory computer-readable medium of claim 12, wherein a menu is provided to the customer for receiving data for connecting the two sites with the first and second virtual private networks.

14. The non-transitory computer-readable medium of claim 13, wherein the data received from the customer comprises a number of customer edge routers at each of the two sites, a set of address prefixes at each of the two sites, and a plurality of proposed locations for a plurality of provider edge routers.

15. A system for advertising routes in a communication network, the system comprising:
   a processor; and
   a computer-readable medium, storing a plurality of instructions which, when executed by the processor, cause the processor to perform operations, the operations, comprising:
      creating a first virtual private network in a public domain of the communication network; and
      creating a second virtual private network in a private domain of the communication network, wherein the first and the second virtual private networks are controlled via two separate control planes; and
      advertising the routes between two sites over the two separate control planes to the first and second virtual private networks.

16. The system of claim 15, wherein the communication network is an internet protocol network.

17. The system of claim 15, wherein the first virtual private network comprises a public provider edge device, and wherein the second virtual private network comprises a private provider edge device.

18. The system of claim 15, wherein the first virtual private network comprises a public provider edge device, and wherein the second virtual private network comprises a private provider edge device.

19. The system of claim 15, where the first and second virtual private networks are created in response to a request from a customer.

20. The system of claim 19, wherein data is received from the customer for connecting the two sites with the first and second virtual private networks, wherein the data received from the customer comprises a number of customer edge routers at each of the two sites, a set of address prefixes at each of the two sites, and a plurality of proposed locations for a plurality of provider edge routers.

* * * * *